United States Patent
Lee

(10) Patent No.: US 8,227,364 B2
(45) Date of Patent: Jul. 24, 2012

(54) POROUS PLANTING MEDIUM CONTAINING MINERALS AND METHOD FOR PREPARING THE SAME

(75) Inventor: Se-Lin Lee, Seoul (KR)

(73) Assignee: Se-Lin Lee, Seoul (KR)

(*) Notice: Subject to any disclaimer, the term of this patent is extended or adjusted under 35 U.S.C. 154(b) by 57 days.

(21) Appl. No.: 12/809,246

(22) PCT Filed: Dec. 22, 2008

(86) PCT No.: PCT/KR2008/007574
§ 371 (c)(1),
(2), (4) Date: Jun. 18, 2010

(87) PCT Pub. No.: WO2009/082145
PCT Pub. Date: Jul. 2, 2009

(65) Prior Publication Data
US 2010/0281936 A1    Nov. 11, 2010

(30) Foreign Application Priority Data
Dec. 20, 2007  (KR) .......................... 10-2007-0134649

(51) Int. Cl.
*C04B 38/00* (2006.01)
*C04B 33/32* (2006.01)

(52) U.S. Cl. .............. 501/80; 501/84; 501/89; 501/100; 501/141; 71/62; 71/900; 264/43; 264/44

(58) Field of Classification Search ............... 501/80, 501/84, 89, 100, 141; 71/62, 900; 264/43, 264/44
See application file for complete search history.

(56) References Cited

U.S. PATENT DOCUMENTS
5,714,000 A * 2/1998 Wellen et al. ............... 106/601
2010/0303663 A1 * 12/2010 Lee .................................. 419/2

FOREIGN PATENT DOCUMENTS
| KR | 1997-012154 | 3/1997 |
| KR | 10-1999-0053323 | 11/1999 |
| KR | 20-2002-0023151 | 12/2002 |
| KR | 20050010402 A | 1/2005 |
| KR | 1020070036546 A | 4/2007 |

OTHER PUBLICATIONS
Patent Cooperation Treaty, International Preliminary Report on Patentability, PCT/KR2008/007574, Jun. 22, 2010.
Korean Intellectual Property Office, International Search Report, PCT/KR2008/007574, Aug. 10, 2009.

* cited by examiner

*Primary Examiner* — Karl Group
(74) *Attorney, Agent, or Firm* — Andrew D. Gerschutz; Tristan A. Fuierer; Moore & Van Allen, PLLC

(57) ABSTRACT

The present invention relates to a porous planting medium containing minerals and a method for preparing the same, and more particularly, to a porous planting medium prepared by using bentonite and/or zeolite and minerals for promoting plant growth as raw materials and a method for preparing the same. The porous planting medium containing minerals according to the present invention can provide places where plants can grow due to the pores therein and create the ideal environment for plant growth due to minerals used therein. Also, since it is installed in a building with plant seeds germinated therein, it can provide effects of interior decoration, wood bathing due to anion generation and a pleasant interior environment.

8 Claims, 3 Drawing Sheets

POROUS PLANTING MEDIUM CONTAINING MINERALS AND METHOD FOR PREPARING THE SAME

CROSS-REFERENCE TO RELATED APPLICATIONS

This application is filed under the provisions of 35 U.S.C. §371 and claims the priority of International Patent Application No. PCT/KR2008/007574 filed on 22 Dec. 2008 entitled "Porous Planting Medium Containing Minerals and Method for Preparing the Same" in the name of Se-Lin Lee, which claims priority of Korean Patent Application No. 10-2007-0134649 filed on 20 Dec. 2007, both of which are hereby incorporated by reference herein in their entirety.

TECHNICAL FIELD

The present invention relates to a porous planting medium containing minerals and a method for preparing the same, and more particularly, to a porous planting medium prepared by using bentonite and/or zeolite and minerals for promoting plant growth as raw materials and a method for preparing the same.

BACKGROUND ART

With the development of city lifestyle, there are less chances of growing and cultivating plants, trees and flowers using soil. Particularly, it is difficult to introduce a garden to high-rise apartment buildings, and thus people are growing plants in small pots.

Not only for households, but also for streets, streams or the like, many efforts are being made to achieve aesthetic and functional benefits through planting of plants. For example, there is a patent disclosing bricks for sidewalk (Korean Patent Laid-Open Publication No. 2007-0036546) in which pores are formed so that plants can grow therein, thereby creating an eco-friendly environment for parking lots and footpaths.

Also, there is a patent relating to an artificial planting mat comprising a porous web for planting aquatic plants in and around water (Korean Patent Registration No. 513704), and a filler which is filled in the web to promote growth and attachment of the aquatic plants, and a patent relating to an embankment block for planting, which is installed along the embankment face to prevent the washout of soil by running water, and thus soil is maintained in the earth and sand of planted area and fertilized to promote natural plant growth, thus protecting the embankment face while creating an eco-friendly environment (Korean Utility Model Registration No. 295220).

However, the development of techniques, which can incorporate a planting function into building materials to show aesthetic effect as well as functional effect through planting in indoor space such as households or offices, remains unsatisfactory.

Therefore, the present inventors have made extensive efforts to solve the problems occurring in the prior art and as a result, have found that when a porous planting medium is prepared using bentonite and minerals as raw materials, and plant seeds mixed with minerals are planted in pores of the porous planting medium to germinate, then the medium is installed in a building, it shows effects of oxygen supply, humidity control and indoor landscape as well as noise proof, fireproof and heat insulation. Based on the above founding, the present invention has been completed.

SUMMARY OF INVENTION

Accordingly, it is an object of the present invention to provide a porous planting medium containing minerals, which can be directly installed in a building and a method for preparing the same.

To achieve the above object, the present invention provides a method for preparing a porous planting medium containing minerals, which comprises the steps of: (a) blending 100 parts by weight of bentonite and/or zeolite with 5 to 15 parts by weight of minerals; (b) blending 100 parts by weight of the mixture obtained in the step (a) with 2 to 20 parts by weight of diamond or silicon carbide; and (c) sintering the mixture obtained in the step (b) in a furnace at a temperature of 1100 to 1400° C. for 2 to 5 hours.

The present invention also provides a porous planting medium comprising minerals, which is prepared according to the above-described method.

The present invention also provides the use of a porous medium as a construction material.

Other features and aspects of the present invention will be more apparent from the following detailed description and the appended claims.

DETAILED DESCRIPTION OF THE INVENTION, AND PREFERRED EMBODIMENTS

Figure 1:
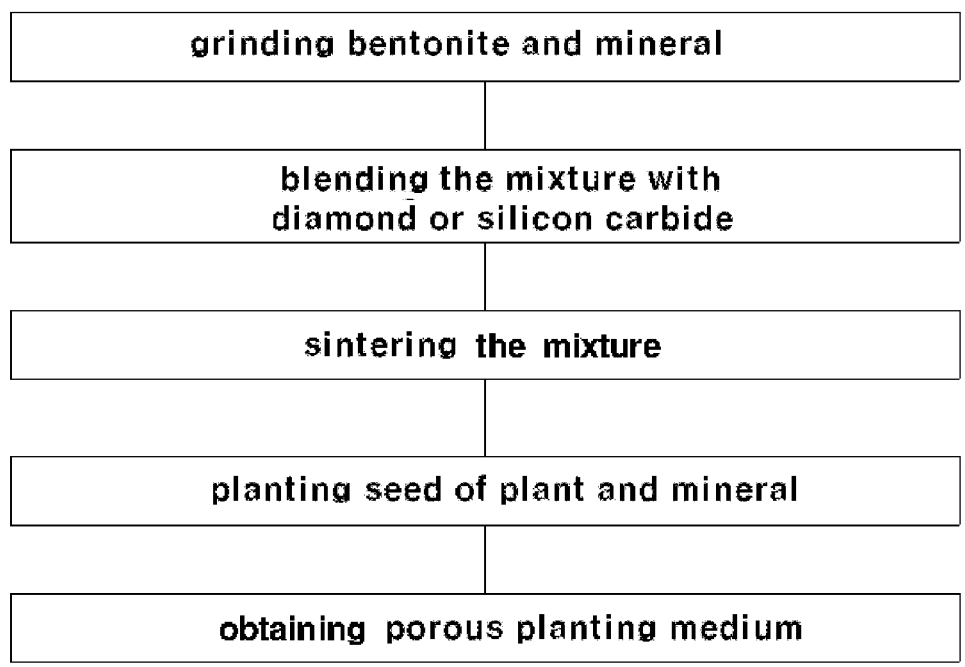
FIG. 1 is a flow chart showing the process for preparing the porous planting medium according to the present invention.

In one aspect, the present invention relates to a method for preparing a porous planting medium containing minerals, which comprises the steps of (a) blending 100 parts by weight of bentonite and/or zeolite with 5 to 15 parts by weight of minerals; (b) blending 100 parts by weight of the mixture obtained in the step (a) with 2 to 20 parts by weight of diamond or silicon carbide; and (c) sintering the mixture obtained in the step (b) in a furnace at a temperature of 1100 to 1400° C. for 2 to 5 hours.

The term "planting medium" as used herein refers to a panel where seeds can be planted to grow plants.

Bentonite used as a raw material for the porous planting medium according to the present invention consists mostly of montmorillonite. It has a pearly luster or waxy luster and is mined as an oily bulky rock. It expands by absorbing water and has high cation-exchange capacity, like montmorillonite.

Meanwhile, montmorillonite is a mineral belonging to the monoclinic system and has the chemical formula: $(Al,Mg)_2Si_4O_{10}(OH)_2$. It is bulky and amorphous, and absorbs water to expand to 7 to 10 times its original volume. Also, it has high cation-exchange capacity. At a water content of 150%, it shows viscosity and at a water content of about 500%, it loses viscosity. It is special clay having a poor frictional resistance.

Zeolite used as a material for the porous planting medium according to the present invention refers to hydrous aluminum silicate minerals of alkali and alkaline earth metal. It has high water content and can adsorb micro particles.

In the present invention, bentonite and zeolite can be used alone or in combination. When bentonite and zeolite are used in a combination, 50 to 150 parts by weight of zeolite is preferably mixed with 100 parts by weight of bentonite.

In the porous planting medium according to the present invention, the pores are formed by diamond or silicon carbide added to bentonite and/or zeolite in the preparation and provide places where plants can grow. The diamond or silicon carbide is harmless to plant growth.

Particularly, in the present invention, the porous planting medium is prepared using minerals which are an indispensible component for many functions in living organisms, and thus it can promote plant growth. Also, when the porous planting medium is applied to a building, it can provide effects of oxygen supply, humidity control, anion generation and indoor landscape.

In the present invention, the step (a) is preferably performed by additionally adding one or more selected from the group consisting of phosphate rock, apatite, terra alba, mica and potash feldspar to bentonite and/or zeolite to blend. The added amount of one or more selected from the group consisting of phosphate rock, apatite, terra alba, mica and potash feldspar is 100 to 150 parts by weight based on 100 parts by weight of bentonite and/or zeolite.

Meanwhile, the blending in the method for preparing the porous planting medium according to the present invention means that bentonite and/or zeolite, minerals and one or more selected from the group consisting of phosphate rock, apatite, terra alba, mica and potash feldspar, which can be additionally added, are pulverized and then mixed. Hear, the pulverized materials have a particle size of preferably 20 to 150 mesh, more preferably 50 to 120 mesh.

The phosphate rock, apatite, terra alba, mica and potash feldspar, which can be used as an additional material in the preparation of the porous planting medium according to the present invention, provide properties such as strength that allow the porous planting medium to be used as a material for a building and also they are suitable materials for preparing the porous planting medium according to the present invention since they are non-toxic minerals or clay to plant growth.

According to the present invention, the minerals are selected from the group consisting of yellow soil, jade, elvan, germanium, clay, kaolin, lime, tourmaline and a mixture thereof.

When the minerals are added in an amount of less than 5 parts by weight based on 100 parts by weight of bentonite and/or zeolite, the resulting porous planting medium cannot create the ideal environment for plant growth. When the minerals are added in an amount of more than 15 parts by weight based on 100 parts by weight of bentonite and/or zeolite, properties of the resulting porous planting medium are deteriorated as a construction material. Therefore, the amount of the minerals used in the preparation of the porous planting medium is preferably 5 to 15 parts by weight based on 100 parts by weight of bentonite and/or zeolite.

According to the present invention, diamond or silicon carbide are used to form pores in the porous planting medium and are harmless to human bodies. Also, they promote plant growth. In addition, they melt only at a high temperature and thus they form pores in the sintering process, thus resulting in a light weight porous planting medium.

Meanwhile, when the diamond or silicon carbide is added in an amount of less than 2 parts by weight based on the 100 parts by weight of the mixture obtained in the step (a), the number of pores was not sufficient and thus the effect of the light weight planting medium cannot be achieved. When the diamond or silicon carbide is added in an amount of more than 20 parts by weight based on the 100 parts by weight of the mixture obtained from the step (a), pores are excessively formed and thus properties of the resulting porous planting medium are deteriorated. Therefore, the amount of diamond or silicon carbide used in the preparation of the porous planting medium is preferably 2 to 20 parts by weight based on 100 parts by weight of the 100 parts by weight of the mixture obtained in the step (a).

The method for preparing the porous planting medium according to the present invention includes the sintering process. In the sintering process, when the sintering temperature is lower than 1100° C., long sintering time is required. When it exceeds 1400° C., although the sintering time is shortened, the pore size excessively increased, thus causing strength deterioration of the porous planting medium.

Also, when the sintering time is shorter than 2 hours, the pore size is reduced. When the sintering time is longer than 5 hours, the number of pores is decreased, and thus, it is not possible to obtain a light weight planting medium.

Therefore, according to the present invention, the sintering temperature and the sintering time of the sintering step are preferably 1100 to 1400° C. and 2 to 5 hours, respectively.

The porous planting medium according to the present invention can be prepared according to the above-described preparation method. At this time, the shape and size of the porous planting medium can be adjusted to prepare as desired and the size of the pores can be adjusted according to the size of a plant to be grown therein.

In another aspect, the present invention relates to a porous planting medium comprising minerals, which is prepared according to the above-described method.

Since the porous planting medium according to the present invention has pores, it has the effect of weight (w/v) decreased compared to the same volume of a conventional medium having no pores formed therein, thus making it possible to improve a building construction efficiency.

In yet another aspect, the present invention relates to a method for using the porous planting medium in a building.

When the porous planting medium is applied to interior construction, the first step is preferably performed by germinating plants in the porous planting medium. Specifically, minerals and plant seeds are mixed together in water and sowed in the pores of the medium for germination.

In the second step, the porous planting medium containing minerals is attached to a concrete wall. At this time, the attachment can be performed by the following four methods.

First, a frame is prepared according to the shape of the prepared porous planting medium, for example, square or circle and the porous planting medium is attached thereto, in which the porous planting medium is detachably attached and thus can be replaced if desired. Second, cement or a binder for minerals is used for the attachment. Third, grooves are formed on a wall according to the shape of the porous planting medium to fix the porous planting medium therein, wherein the porous planting medium is detachably fixed to the groove and thus can be replaced if desired. Fourth, the frame can be made in various shapes and the porous planting medium can be fixed by adjusting to the shape of the frame, thus making it possible to provide the effect of interior decoration effect.

When the porous planting medium having plants germinated therein is used as a construction material according to the present invention, since it has functions beneficial for human body such as removal of offensive odor, oxygen supply and air purification due to minerals contained in the porous planting medium, it is effective in improving atopic dermatitis which is one of the representative skin diseases related to sick house syndrome. Also, since the porous planting medium can generate anions, it can provide the effect of being in the woods.

Further, since the porous planting medium according to the present invention have the effect of interior decoration functions, as well as, is used as a construction material, thus making it possible to reduce the cost required for wall paper, painting, decoration and the like after construction.

EXAMPLES

Hereinafter, the present invention will be described in further detail with reference to examples. It is to be understood, however, that these examples are for illustrative purposes only and are not to be construed to limit the scope of the present invention.

In the following Examples, only bentonite is illustrated but zeolite or a mixture of bentonite and zeolite can also be included within the scope of the present invention.

Example 1

Preparation of Porous Planting Medium Containing Bentonite and Mineral

Figure 2:
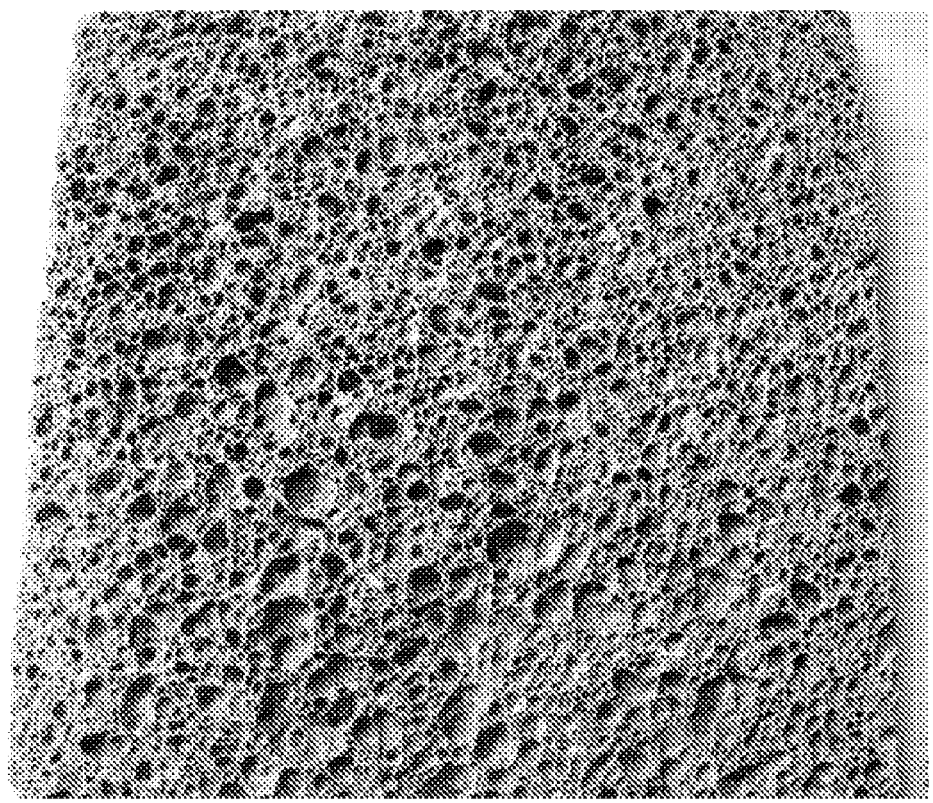
FIG. 2 shows the porous planting medium according to the present invention.

A porous planting medium containing mineral was prepared using bentonite and yellow soil as mineral. 90 kg of bentonite and 7 kg of yellow soil were pulverized to a particle size of 50 to 120 mesh and blended. 3 kg of silicon carbide, which had been pulverized to a particle size of 50 to 120 mesh, was added thereto and blended using a blender. The mixture was put into a furnace and sintered at 1200° C. for 5 hours, thus obtaining a porous planting medium (FIG. 2).

Figure 3:
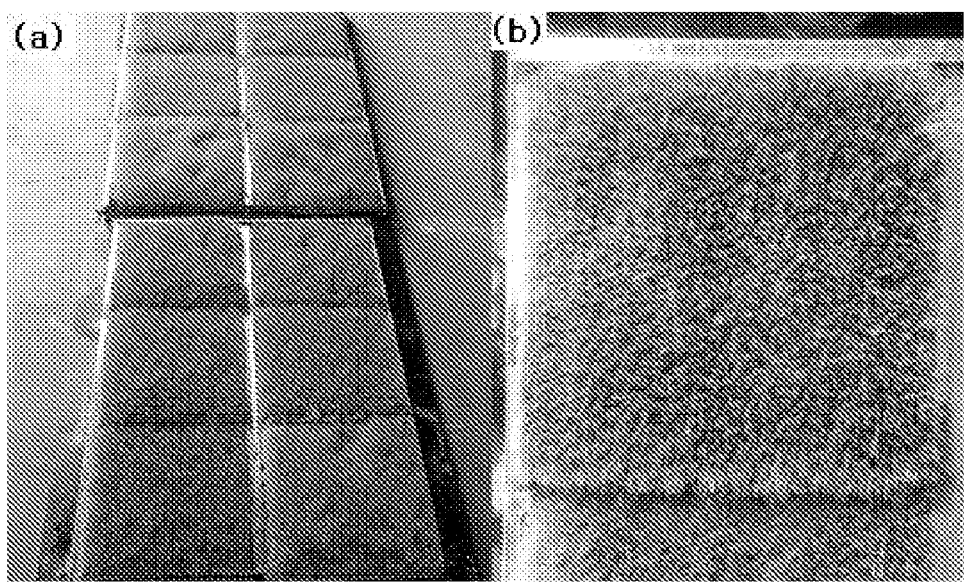
FIG. 3 (a) and (b) respectively show photographs of lawn which has germinated in the porous planting medium according to the present invention.

1 g of yellow soil, 1 g of lawn seeds and 2 g of water were mixed and planted in the porous planting medium and kept at room temperature. After 72 hours, germination of lawn seeds was confirmed, thus obtaining a porous planting medium containing mineral (FIG. 3).

Example 2

Preparation of Porous Planting Medium Containing Bentonite, Mica and Mineral

A porous planting medium containing mineral was prepared using bentonite, mica and yellow soil as mineral. 80 kg of bentonite, 80 kg of mica and 5 kg of yellow soil were pulverized to a particle size of 50 to 120 mesh and blended. 3 kg of silicon carbide, which had been pulverized to a particle size of 50 to 120 mesh, was added thereto and blended using a blender. The mixture was put into a furnace and sintered at 1200° C. for 5 hours, thus obtaining a porous planting medium (FIG. 2).

1 g of yellow soil, 1 g of lawn seeds and 1 g of water were mixed and planted in the porous planting medium and kept at room temperature. After 48 hours, germination of lawn seeds was confirmed, thus obtaining a porous planting medium containing mineral.

Example 3

Interior Construction Using Porous Planting Medium Containing Mineral

The porous planting medium containing mineral prepared in Example 1 was installed in a wall of living room. On the wall, three frames connected to each other, each having a dimension of a width of 50 cm, a height of 50 cm and a depth of 3 cm, were prepared using bentonite and yellow soil which is the same raw materials as those used for the porous planting medium, and the porous planting medium having lawn seeds germinated therein was attached thereto using a mineral binder.

Example 4

Anion Generation Effect of Porous Planting Medium Containing Mineral

The porous planting medium containing mineral prepared in Example 2 was installed in a wall of living room as described in Example 3, and examined for the amount of anion generated using an anion detector (Andes, JP). Also, the amount of anions generated in a forest (O-hyang li, shinchon up, Kwangju si, Gyungki do, Korea) was measured using an anion detector (Andes, JP).

As a result, it was found that the amount of anion generated by the porous planting medium containing mineral and the amount of anion generated in the forest were 900 to 1050 ion/cc and 900 to 950 ion/cc, respectively, suggesting that the amounts were similar to each other. Thus, it could be confirmed that when the porous planting medium containing mineral prepared in Example 2 was installed in living room, it can provide the effect of being in the woods.

INDUSTRIAL APPLICABILITY

As described above, the porous planting medium containing minerals according to the present invention can provide places where plants can grow due to the pores therein and create the ideal environment for plant growth due to minerals used therein. Also, since it is installed in a building with plant seeds germinated therein, it can provide the effects of interior decoration and a pleasant interior environment as well as the effect of being in the woods due to anion generation.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof

What is claimed is:

1. A method for preparing a porous planting medium containing minerals, which comprises the steps of:
   (a) blending 100 parts by weight of bentonite and/or zeolite with 5 to 15 parts of weight of minerals;
   (b) blending 100 parts by weight of the mixture obtained in the step (a) with 2 to 20 parts by weight of diamond or silicon carbide; and
   (c) sintering the mixture obtained in the step (b) in a furnace at a temperature of 1100 to 1400° C. for 2 to 5 hours.

2. The method for preparing a porous planting medium containing minerals according to claim 1, wherein the step (a) is performed by additionally adding one or more selected from the group consisting of phosphate rock, apatite, terra alba, mica and potash feldspar.

3. The method for preparing a porous planting medium containing minerals according to claim 2, wherein the added amount of one or more selected from the group consisting of phosphate rock, apatite, terra alba, mica and potash feldspar is 100 to 150 parts by weight based on 100 parts by weight of bentonite and/or zeolite.

4. The method for preparing a porous planting medium containing minerals according to claim 1, wherein the minerals in the step (a) is selected from the group consisting of yellow soil, jade, elvan, germanium, clay, kaolin, lime, tourmaline and a mixture thereof.

5. A porous planting medium comprising minerals, which is prepared by the method of claim 1.

6. A porous planting medium comprising minerals, which is prepared by the method of claim 2.

7. A porous planting medium comprising minerals, which is prepared by the method of claim 3.

8. A porous planting medium comprising minerals, which is prepared by the method of claim 4.

* * * * *